J. H. RHODES.
Supply and Distributing Pipes for Water, Gas, &c., Under Pressure.
No. 214,452. Patented April 15, 1879.
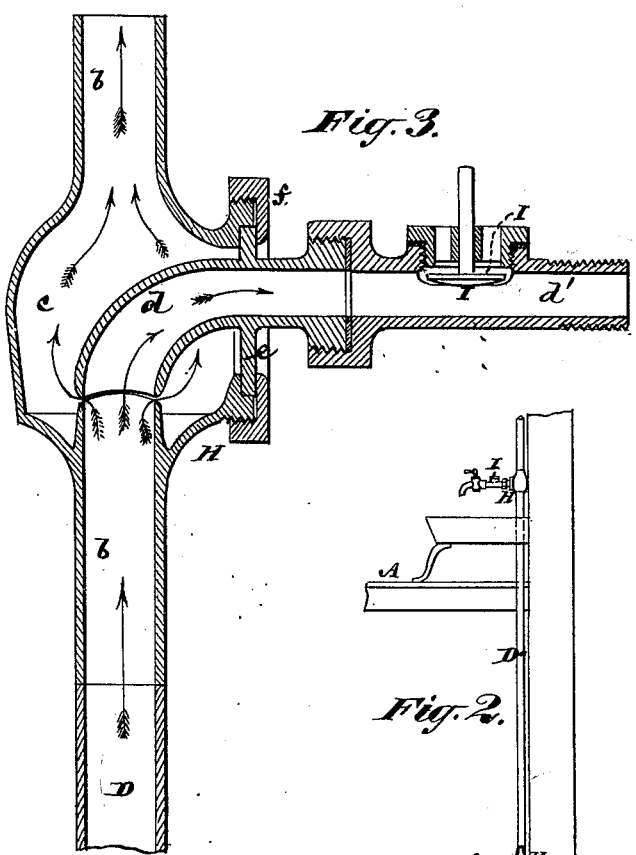
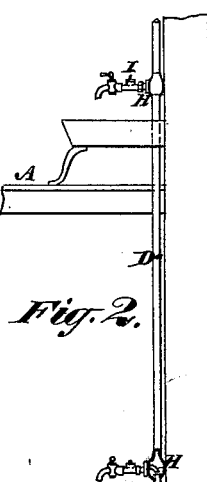
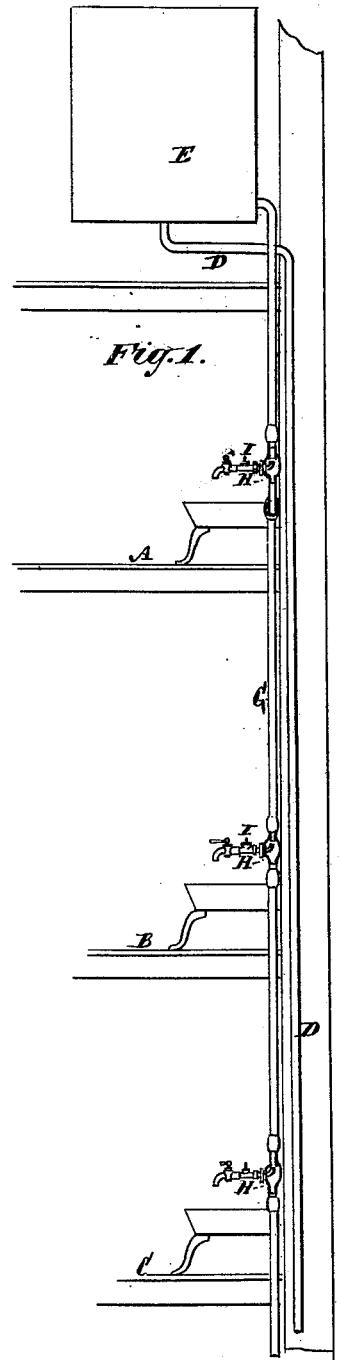
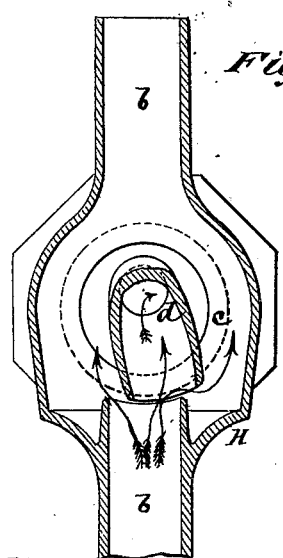
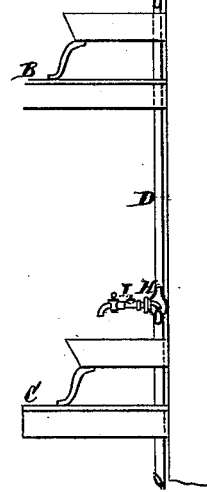
Witnesses
John Becker
Fred Haynes
Inventor
John H. Rhodes
by his Attorneys
Brown & Brown

UNITED STATES PATENT OFFICE.

JOHN H. RHODES, OF BROOKLYN, NEW YORK.

IMPROVEMENT IN SUPPLY AND DISTRIBUTING PIPES FOR WATER, GAS, &c., UNDER PRESSURE.

Specification forming part of Letters Patent No. 214,452, dated April 15, 1879; application filed October 12, 1878.

*To all whom it may concern:*

Be it known that I, JOHN H. RHODES, of the city of Brooklyn, in the county of Kings and State of New York, have invented new and useful Improvements in Supply and Distributing Pipes for Water, Gas, Steam, and other Fluids under Pressure, of which the following is a description, reference being had to the accompanying drawings, forming part of this specification.

This invention relates to the apportioning of the supply of water, gas, steam, or other fluid under pressure, and has for one of its objects the trapping for distribution of water in a supply pipe or pipes as it moves toward its lowest point of discharge, and the similar trapping of gaseous fluids as they rise toward their highest point of delivery, whereby a proper apportionment of the supply is or may be made to different or extreme grades.

Among the several purposes or uses to which the invention is applicable is the distribution of water upon the several floors of buildings, subject to apportionment or such variations in regard to quantity as that any proportion of the whole supply may be furnished to one floor or be divided upon all the floors in any desired quantities. This forms another or special object of the invention, and, although the latter is applicable to different purposes or uses in which it is required to apportion the distribution of water, steam, or gas to different points, either on the same level or at different altitudes, the invention will here be more particularly described as applied to the distribution of water upon the several floors of a building. By such application of the invention tenants upon any one or more of the floors cannot materially affect the supply upon the other floors, yet, if desired, the whole supply of water from the street-main may be concentrated upon a single floor, if not needed elsewhere in the building, also whereby an equal distribution of the supply to the several floors is obtainable, and so that when draft is made at any one of the floors water in the same service or distributing pipe is trapped to supply the other floors.

The invention consists in an apportioner formed of a bent trap-tube arranged to project at its bent end or mouth within the main or distributing pipe or continuous connection therewith at each or any of the points of supply from said pipe, such apportioner being of a suitable size to furnish the necessary supply at a given point, and preferably being adjustable to vary its exposure to the course of the current through the pipe with which it connects, and so to increase or diminish the supply through it.

Furthermore, the invention, when applied to the distribution of water upon the several floors of buildings, consists in a combination, with said apportioner, of a vacuum-valve which will effectually prevent the collapse of a kitchen-boiler upon either or any of the several floors, whether the vacuum is caused by the emptying of the street-main for repairs or by drafts of water below greater than the immediate supply from the street-main.

In the drawings, which illustrate the invention as applied to the distribution of water to the several floors of a building, Figure 1 represents an elevation of the several floors of a building, in part, with the invention as applied when the water is furnished from an upper tank supplied by a separate pipe from the street-main; Fig. 2, a similar view, in part, but showing the invention as applied when the water is supplied to the several floors direct from the street-main instead of indirectly from an upper tank. Fig. 3 is a sectional view, upon a larger scale, of a tubular fitting and adjustable apportioner with vacuum-valve connection; and Fig. 4, a sectional view, upon a like scale to Fig. 3, but in a plane at right angles thereto, of said apportioner in a slightly different position of adjustment.

In Fig. 1, A B C represent the several floors of a building, and D the service-pipe from a street-main conveying water to an upper tank or reservoir, E, from which the water is supplied by a downward-distributing pipe, G, to the several floors.

H H are the tubular fittings with attached apportioners from the pipe G to the different floors. These devices H, which are shown more clearly in Figs. 3 and 4 of the drawings, mainly consist of an interposed tube or pipe connection, *b*, in line with and forming a part of the distributing or service pipe, accordingly as the supply is a direct or indirect one, and of an adjustable bent trap-tube or apportioner, *d*, through which the distribution is made to the floor, said trap-tube having its bent portion, mouth, or receiving end arranged to project within a swell, *c*, in the pipe-connection *b*, and said tube being capable of axial adjustment in said pipe-connection *b*, to put its bent receiving end in line or more or less out of line with the pipe or pipe-connection *b*, to which it is attached for the purpose of giving an increased or diminished and graduated supply through the apportioner.

In Fig. 3 the mouth or receiving end of the trap-tube is represented as directly facing or in line with the pipe *b*, to which it is attached, and in Fig. 4, as slightly turned to one side for the purpose of varying the supply through it. The area of the swell *c* is such that the bent or receiving end of the trap-tube does not interfere with the free flow of the water past it to the other floors of the building.

In Figs. 3 and 4, as also in Fig. 2, the bent or receiving end of the trap-tube is represented as having a downward exposure instead of an upward exposure, as in Fig. 1, to adapt it to an upward supply direct from the service-pipe D. This arrangement provides for a free supply of water to the upper rooms for wash-basin or other purposes when the water is drawn direct from the service-pipe, even though water is being drawn off at the kitchen or lower floor of a building which is not a tenement-house or does not consist of a series of flats. But the invention will be found particularly serviceable in tenement-houses and what are known as "French flats;" and by means of the adjustable trap-tube *d* an equal supply of water may be insured to the several floors, or it may be apportioned as required by more or less diverting the supply through the adjustable apportioners, accordingly as the mouths of the trap-tubes are turned to face the current or more or less away from it as the water flows up or down the pipe to which the trap-tubes are attached, and the entire supply may be diverted to any one or more of the floors when not required on the other floors.

To provide for the axial adjustment of the trap-tube *d* it may be provided with a circular flange, *e*, arranged to sit within a circular recess in one side of the swell *c*, and, when adjusted, be secured by a screw-collar, *f*.

Attached, by a screw-joint or otherwise, to the outer end of the trap-tube *d* is a tubular coupling or extension, *d'*, which virtually forms a part of said trap-tube, and serves as an outlet, which may either have a draft-cock attached to it, as shown in Figs. 1 and 2, or may connect with a kitchen-boiler on the same floor, or the adjustable water-apportioner may have both a draft-cock and a kitchen-boiler connection.

Applied to each or any of the tubular fittings H, preferably to the tubular extension *d'* of each trap-tube *d*, is a vacuum or air valve, I, opening inward, and serving to prevent the collapse of the kitchen-boiler upon each or any of the several floors by admitting air to destroy the vacuum, from whatever cause the latter may have been produced.

It will be obvious that the apportioners or bent trap-tubes *d* may be applied with equal or like advantage to mains or pipes for distributing or apportioning the supply of steam or gas, and that the same are applicable to horizontal as well as to upright and various angular distributions.

I claim—

1. The combination, with a supply or distributing pipe or pipe-connection, *b*, of a bent trap-tube or apportioner, *d*, having its bent or receiving end within said pipe or pipe-connection, substantially as specified.

2. The combination of the axially-adjustable bent trap-tube or apportioner *d* with the supply or distributing pipe or connection *b*, having a swell, *c*, essentially as described.

3. The combination, with a bent trap-tube or apportioner, *d*, and supply pipe or connection *b*, of the vacuum-valve I, essentially as and for the purposes described.

JOHN H. RHODES.

Witnesses:
JESSE C. BEAM,
JOHN D. RHODES.